UNITED STATES PATENT OFFICE.

GEORGE H. MERRILL, OF NEW YORK, N. Y.

LUBRICATING COMPOUND FOR CAR-AXLES, &c.

SPECIFICATION forming part of Letters Patent No. 246,532, dated August 30, 1881.

Application filed March 12, 1881. (No specimens.)

*To all whom it may concern:*

Be it known that I, GEORGE H. MERRILL, of the city of New York, in the county of New York and State of New York, have made certain new and useful Improvements in Lubricating Compounds for Car-Axles and other Machinery; and I do hereby declare that the following is a full and clear description thereof.

This invention relates to a composition for keeping in good working condition car-axles, carriage-axles, and heavy machinery of all kinds.

It consists of a combination of different ingredients, as hereinafter described, to be applied as and for the purposes above mentioned.

To enable those skilled in the art to make and use my improvement in lubricating compounds for axles and other machinery, I describe its composition and mode of application to be as follows:

I take one and a half pound of tallow; one and a half pound of rosin; two gallons of the settling in the still after the distillation of petroleum, and which is known as "petroleum-tar," its commercial name in the oil trade being "residuum;" one pound of lime and one gallon of water, which form an alkali, and one-half pound graphite. When the above-named ingredients are thoroughly and properly mixed and compounded the preparation is complete.

The mode of application will be readily understood without any further explanation.

Having described my invention, I claim—

The combination of tallow, rosin, the settling in the still after the distillation of petroleum, which is known as "petroleum-tar" or "residuum," lime and water, which form an alkali, and graphite, in the proportions and for the uses and purposes as above set forth.

Dated, New York, March 11, 1881.

G. H. MERRILL.

Witnesses:
ANDREW N. RANKIN,
JOHN HAHN, Jr.